(No Model.) 3 Sheets—Sheet 1.

G. W. AUSTIN.
Machine for Planing Blind Slats.

No. 231,389. Patented Aug. 24, 1880.

Witnesses.
S. N. Piper
W. W. Lunt

Inventor.
George W. Austin.
by attorney (No Model.) 3 Sheets—Sheet 2.

G. W. AUSTIN.
Machine for Planing Blind Slats.

No. 231,389. Patented Aug. 24, 1880.

Witnesses.
S. N. Piper
Wm W. Lunt

Inventor.
George W. Austin
by attorney
R. H. Eddy

N. PETERS, PHOTO-LITHOGRAPHER, WASHINGTON, D.C.

(No Model.)   3 Sheets—Sheet 3.

G. W. AUSTIN.
Machine for Planing Blind Slats.

No. 231,389.   Patented Aug. 24, 1880.

Witnesses.
S. N. Piper
W. A. Hunt

Inventor.
George W. Austin
by attorney
R. H. Eddy

UNITED STATES PATENT OFFICE.

GEORGE W. AUSTIN, OF MANCHESTER, NEW HAMPSHIRE.

MACHINE FOR PLANING BLIND-SLATS.

SPECIFICATION forming part of Letters Patent No. 231,389, dated August 24, 1880.

Application filed June 23, 1880. (No model.)

*To all whom it may concern:*

Be it known that I, GEORGE W. AUSTIN, of Manchester, in the county of Hillsborough and State of New Hampshire, have invented a new and useful Machine for Planing Blind-Slats; and I do hereby declare the same to be described in the following specification, and represented in the accompanying drawings, of which—

Figure 1:
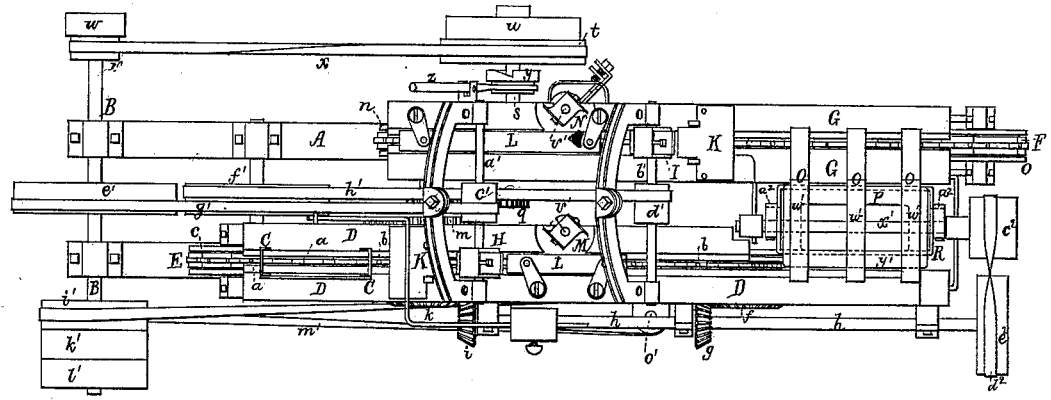
Figure 2:
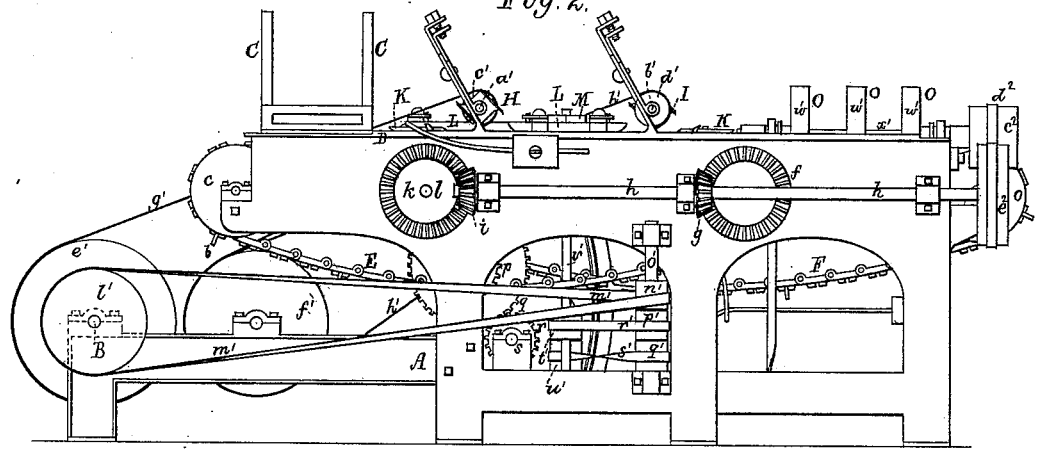
Figure 4:
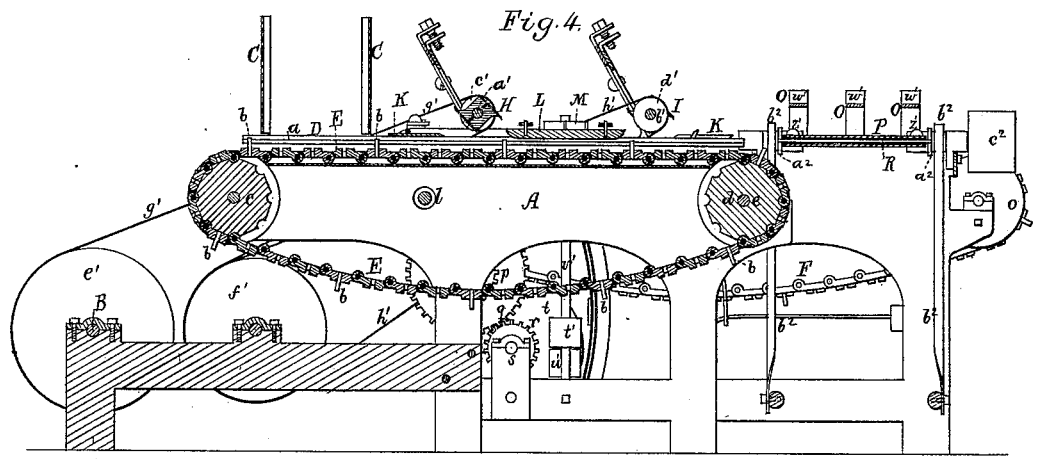
Figure 6:
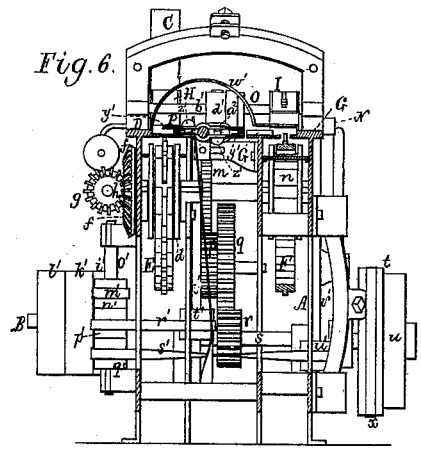
Figure 7:
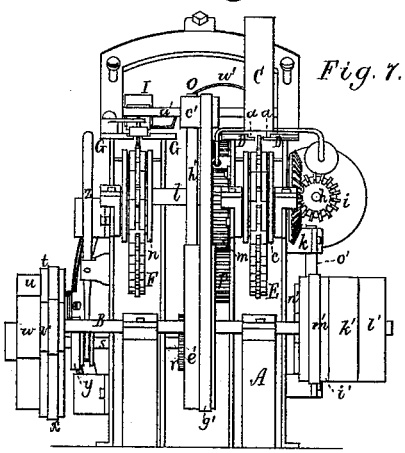
Figure 3:
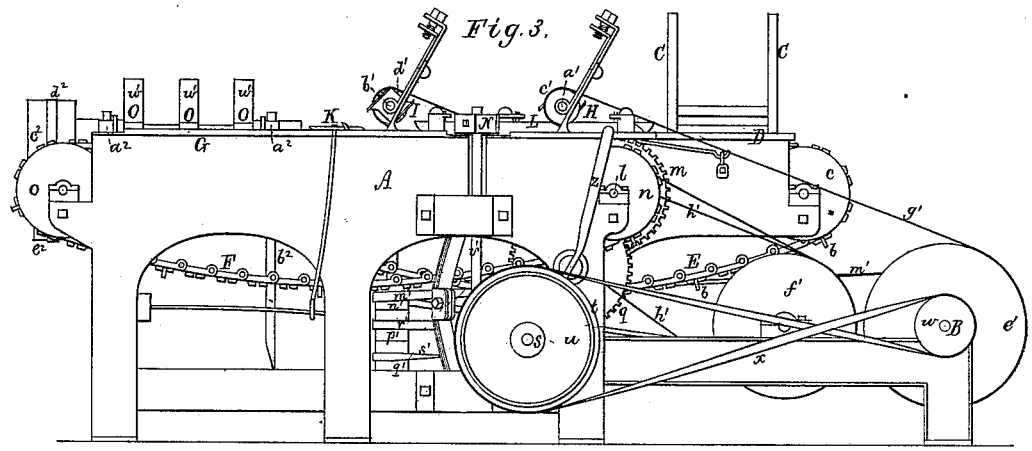
Figure 5:
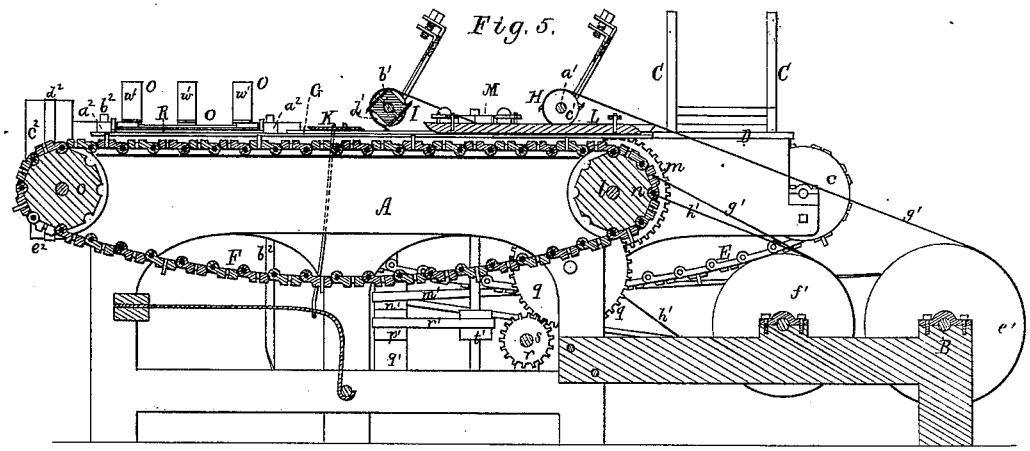
Figure 8:
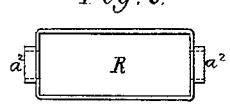
Figure 9:
Figure 10:
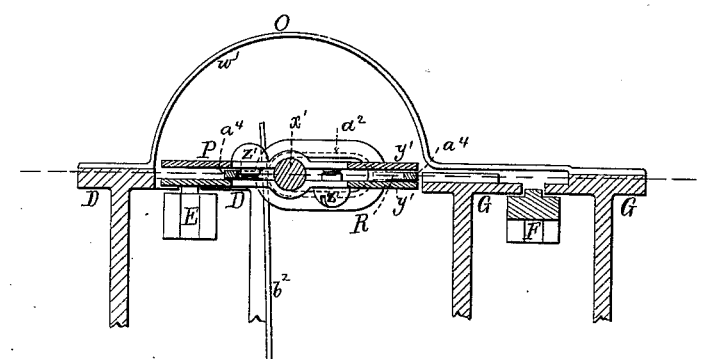
Figure 11:
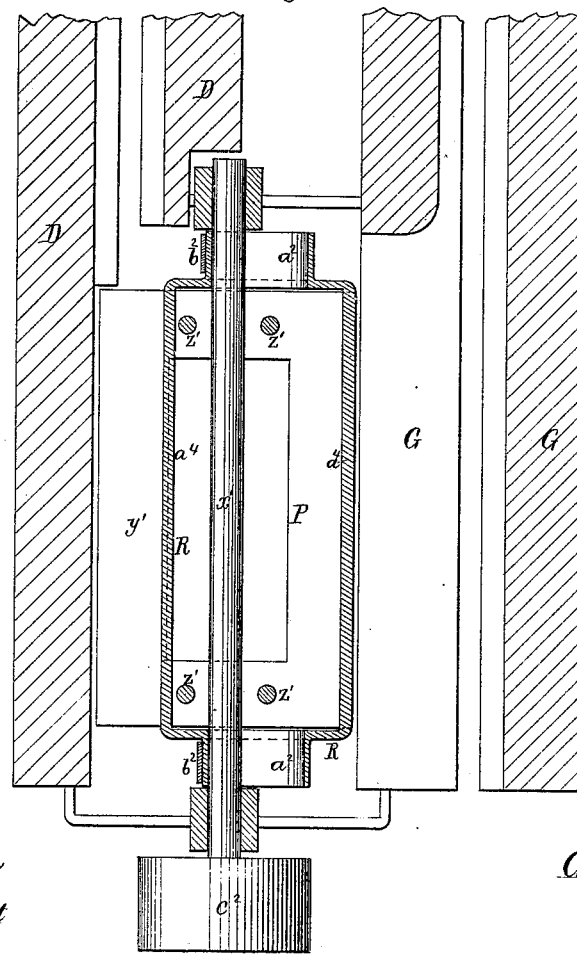

Figure 1 is a top view, Figs. 2 and 3 opposite side elevations, Figs. 4 and 5 longitudinal sections, Fig. 6 a transverse section, and Fig. 7 a rear-end elevation, of a machine embodying my invention. Figs. 8, 9, 10, and 11 show the transfer mechanism.

The longitudinal sections are taken through the endless carriers or chains, the transverse section being taken through the transferrer, to be hereinafter described.

The machine is to plane a blind-slat or other article of like character on its opposite sides and with the grain of the wood. To accomplish this the slats to be operated on are arranged in a pack in suitable upright channeled guides arranged directly over an endless chain or carrier, the lowest one of the pack resting on proper guideways over such carrier. By the said carrier the slats are successively removed from the pack and advanced underneath a cutter-cylinder and pressers and upon the guideways and into the transferrer. The latter in receiving a slat, one side of which has been dressed or planed by the cutter-cylinder, revolves one hundred and eighty degrees of a circle, and the slat is forced out of such transferrer by the ejector and upon the auxiliary guideways and over another endless chain or carrier. This latter, in turn, moves the slat backward underneath another cutter-cylinder and pressers and discharges it from the machine, the upper surface of the slat having been dressed or planed while passing the second cutter-cylinder. The machine also has cutter-cylinders for dressing the longer opposite edges of the slat and reducing it to an equal width, all of which will be hereinafter described.

The nature of my invention is more fully set forth in the claims hereinafter presented.

In the drawings, A denotes the frame of the machine, it being provided with a driving-shaft, B, carrying a series of pulleys, as shown.

Extending up from the top of the frame are the vertically-grooved guides C C, which may be adapted to the frame, so as to be movable apart to set them at the proper distance asunder for the reception of a pack of slats, the lowest slat of the pack resting in the rabbets $a\ a$ of the two guide-rails D D, arranged horizontally and parallel to each other, and a short distance apart.

Beneath the opening between the two guide-rails D D is an endless chain or carrier, E, whose links are provided with sockets for the reception of studs or pins $b$, which, when in place, project from the links sufficiently to cause them, (the said studs,) while being carried through the space directly between the guides, to project a short distance above the plane of the bottom of the rabbets of such guides. The said endless carrier E is supported by and extends about, in manner as shown, two sprocket or prismatic wheels, $c\ d$, arranged as represented. The forward one of such wheels has fixed on its shaft $e$ a bevel-gear, $f$, to engage with a bevel-pinion, $g$, on a horizontal shaft, $h$, arranged on the front of the frame, as shown. At its rear end the said shaft has another bevel-pinion, $i$, that engages with a bevel-gear, $k$, fixed on a transverse shaft, $l$.

Fixed on the shaft $l$ are a spur-gear, $m$, and a sprocket or prismatic wheel, $n$, the latter, with another such wheel, $o$, at the front end of the frame, serving to support another endless chain or carrier, F, arranged, as shown, under two other parallel and rabbeted guides or rails, G G.

The gear $m$, by means of a suitable intervening train of gears, $p\ q$, engages with a driving-gear, $r$, arranged to revolve a shaft, $s$, provided with pulleys $t\ u$, about one of which and one of a pair of pulleys, $v\ w$, fixed on the shaft B, is an endless crossed belt, $x$. A clutch, $y$, arranged on the shaft $s$, and provided with a lever, $z$, for moving it therein, serves to couple the pulleys $t\ u$ to the shaft, as occasion may require.

Over each pair of guide-rails there is one of two facing cutter-cylinders, H I, each of which is disposed between two yielding pressers, K L, arranged as shown, and provided with springs or weights to press them toward the rails. These cutter-cylinders are fixed on transverse shafts $a'\ b'$, carrying band-pulleys $c'\ d'$, about which and two driving-pulleys, $e'\ f'$, driving-bands $g'\ h'$ pass in manner as represented, one of such pulleys being fixed on the shaft B. The band of this latter pulley runs in contact with the periphery of the other pulley, so as to effect the simultaneous revolution of the latter pulley while the rearmost pulley is revolving.

Furthermore, the shaft B has three pulleys, $i'$ $k'$ $l'$, applied to it, they being alike in diameter and arranged side by side. The middle one is a loose pulley and the others are fast pulleys, the outer one being to receive a band from any suitable motor, an endless belt, $m'$, going around the innermost of the three pulleys last named, and a pulley, $n'$, on an upright shaft, $o'$, drives such shaft, which carries two pulleys, $p'$ $q'$. Endless belts $r'$ $s'$ proceed from the pulleys $p'$ $q'$ to and around other pulleys $t'$ $u'$, fixed on the upright shafts $v'$ $r'$ of two cutter-cylinders, M N, arranged as shown, and having cutters for dressing the edge of the slat while it may be passing along on the guide-rails. The shaft of each of the cutter-cylinders is to be or should be supported by suitable devices for effecting the proper adjustment of its cutter-cylinders, such being what are generally used for such purposes in planing-machines.

Of the guide-rails of the first set, D D, the outer one extends some distance beyond its fellow, and there projects from it over to the outer guide-rail of the set G G a series of arched guards, O, shaped as shown. Arranged concentrically with the arched portions $w'$ of such guards is a shaft, $x'$, or that of the transferrer P. The said transferrer is composed of two rectangular frames, $y'$, arranged one directly over and parallel with the other, and at a short distance apart, they being connected by screws $z'$, which serve to clamp them to the shaft $x'$, the shaft going between them. Arranged within the transferrer is the ejector R, which is shown in top view in Fig. 8 and in end view in Fig. 9. It consists of a rectangular frame having at each of its opposite ends an elongated tubular ear, $a^2$, which is to encompass and slide on the shaft $x'$ transversely thereof. The sides or parts $a^4$ of the frame are to slide in the space between the frames $y'$ of the transferrer, as clearly shown in Figs. 10 and 11, Fig. 10 being a transverse and vertical section of the transferrer and ejector and those parts of the machine adjacent thereto, and Fig. 11 a horizontal section of the same on an enlarged scale. Springs $b^2$, near their free ends, bear against the said ears, so as to force the ejector in a direction toward the guide-rails G G.

A pulley, $c^2$, fixed on the shaft of the transferrer, has an endless cross-band, $d^2$, going around it and a driving-pulley, $e^2$, on the shaft $h$, such band and pulleys serving to revolve the transferrer as occasion may require. The transferrer is to be intermittently revolved, it being at rest while it may be receiving a slat, and also while such slat may be in the act of being forced out of it by the ejector. Mechanism for so holding the transferrer at rest is not represented in the drawings, but it may consist of a clutch to stop the pulley $c^2$ from being revolved by its belt, such clutch being thrown into and out of action at the proper times by suitable mechanism.

On a slat having been placed on one side of it, it passes into the transferrer, whose ejector is held forward therein, or toward the guide-rails G G, by the springs acting against one of the ends of each of the ears of such ejector. The transferrer is next revolved or turned over through an arc of one hundred and eighty degrees. As it nears the end of its arc of revolution the other end of each of the ears of the ejector will be brought into contact with the springs, and said ejector will be caused by them to slide, in which case the ejector, acted on by its springs, will expel the slat from the transferrer and force it into the rabbet of the outer rail, G. Next the slat will be forced rearward by the endless carrier, and finally will be discharged from the machine, it having been, while passing forward and backward, planed on its opposite sides and dressed on its opposite longer edges.

The arched guards keep the slat from being thrown out of the transferrer while it may be in revolution.

What I claim as my invention is as follows, viz:

1. The combination of the rotary transferrer and its ejector, having mechanism for operating them, as set forth, with the two sets of guideways and the endless carriers and their pressers and cutter-cylinders for planing the slat on its opposite sides, such carriers and cutter-cylinders having mechanism for operating them, as specified.

2. The combination of the series of arched guards with the two sets of guideways, the rotary transferrer and ejector, and means, substantially as described, for planing a slat on its opposite sides, such rotary transferrer and ejector being to operate as described.

3. The combination of the rotary transferrer and ejector, having mechanism for operating them, as set forth, with the two sets of guideways D D G G, the pack-receiving guides C C, the two endless carriers, and the pressers and four cutter-cylinders, such carriers and cylinders having mechanism for operating them, as described, whereby each slat in its passage through the machine becomes planed on its opposite sides and dressed on its edges to an equal width, all essentially as set forth.

4. The combination of the series of arched guards with the two sets of guideways, the pack-receiving guides, the rotary transferrer and ejector, and means, substantially as described, for planing a slat on both sides and dressing it on both edges while it may be passing over both sets of such guideways, all being to operate essentially as set forth.

GEORGE W. AUSTIN.

Witnesses:
E. B. G. HAZZEN,
ROLAND ROWELL.